United States Patent
Lyatkher (10) Patent No.: US 9,657,715 B1
(45) Date of Patent: May 23, 2017

(54) ORTHOGONAL TURBINE HAVING A BALANCED BLADE

(71) Applicant: Victor Lyatkher, Richmond Heights, OH (US)

(72) Inventor: Victor Lyatkher, Richmond Heights, OH (US)

(*) Notice: Subject to any disclaimer, the term of this patent is extended or adjusted under 35 U.S.C. 154(b) by 0 days.

(21) Appl. No.: 15/197,748

(22) Filed: Jun. 29, 2016

(51) Int. Cl.
- *F03D 3/00* (2006.01)
- *F03B 3/04* (2006.01)
- *F03D 3/06* (2006.01)
- *F03D 9/00* (2016.01)
- *F03B 17/06* (2006.01)
- *F03B 13/10* (2006.01)

(52) U.S. Cl.
CPC .............. *F03D 3/061* (2013.01); *F03B 13/10* (2013.01); *F03B 17/062* (2013.01); *F03D 3/002* (2013.01); *F03D 9/002* (2013.01); *F05B 2220/706* (2013.01)

(58) Field of Classification Search
CPC .......... F03D 3/002; F03D 3/061; F03D 9/002; F03D 15/20; F03D 13/35; F03D 5/005; F03B 3/121; F03B 13/10; F03B 17/062
See application file for complete search history.

(56) References Cited

U.S. PATENT DOCUMENTS

| | | | | |
|---|---|---|---|---|
| 4,718,821 A * | 1/1988 | Clancy | ............. | F03D 7/06 416/119 |
| 7,132,760 B2 * | 11/2006 | Becker | ............. | F03D 3/002 290/44 |
| 7,156,609 B2 * | 1/2007 | Palley | ............. | B23P 15/04 29/889.21 |
| 8,251,662 B2 * | 8/2012 | Parker | ............. | F03D 1/0633 416/176 |
| 8,308,424 B2 * | 11/2012 | Park | ............. | F03B 13/26 290/54 |
| 2009/0129928 A1 * | 5/2009 | Sauer | ............. | F03B 13/264 416/176 |
| 2010/0322770 A1 * | 12/2010 | Sheinman | ............. | F03D 3/061 416/176 |
| 2011/0081243 A1 * | 4/2011 | Sullivan | ............. | F03D 3/002 416/120 |
| 2011/0255975 A1 * | 10/2011 | Perless | ............. | F03D 3/061 416/176 |
| 2015/0330304 A1 * | 11/2015 | Lyatkher | ............. | F02C 3/165 60/39.34 |

* cited by examiner

*Primary Examiner* — Igor Kershteyn
(74) *Attorney, Agent, or Firm* — The Law Offices of Eric W. Peterson (57) ABSTRACT

An orthogonal turbine having a balanced blade having a first end and second end, a first console arm engaged to the first end of the balanced blade, and a first shaft engaged to the first console arm, where the balanced blade has the shape of a 3-dimensional spiral.

14 Claims, 8 Drawing Sheets

ORTHOGONAL TURBINE HAVING A BALANCED BLADE

BACKGROUND

Kinetic energy in flowing medium, such as water and wind, is a known source for power generating systems. Hydroelectric and wind-powered electrical generation systems have been used to generate large quantities of power, including those relying on orthogonal turbines. Current orthogonal based hydro-electric and wind-powered electrical generation systems have many disadvantages including energy loss, reduced system efficiency, and damage. Such affects can result from an unbalanced blade inside the turbine resulting in energy pulsation and vibration. Multiple blades can be used to reduce the optimal rotation speed of the turbine, but this requires the use of multipliers.

SUMMARY OF THE INVENTION

The present disclosure pertains to an orthogonal turbine having a balanced blade having a first end and second end, a first console arm engaged to the first end of the balanced blade, a first shaft engaged to the first console arm, wherein the balanced blade has the shape of a 3-dimensional spiral.

One aspect of the disclosure is an orthogonal turbine of wherein the first end of the balanced blade has the same radial degree as the second end of the balanced blade. Another aspect of the disclosure is an orthogonal turbine wherein the sum of the centrifugal forces acting on the balanced blade is substantially zero. Another aspect of the disclosure is an orthogonal turbine wherein a net force is applied to the middle of the balanced blade. Another aspect of the disclosure is an orthogonal turbine wherein the balanced blade has an angle $\phi$ relative to the tangent of a cross-sectional circle of the 3-dimensional spiral at every position of the balanced blade. Another aspect of the disclosure is an orthogonal turbine wherein the diameter of the balanced blade is less than the length (height) of the balanced blade. Another aspect of the disclosure is an orthogonal turbine having a second console arm engaged to the second end of the balanced blade and a second shaft engaged to the second console arm.

Another aspect of the disclosure is an orthogonal turbine having a first counterbalance engaged to the first console arm. Another aspect of the disclosure is an orthogonal turbine having a first support member having a first shaft hole capable of receiving the first shaft and a second support member having a second shaft hole capable of receiving a second shaft.

Another aspect of the disclosure is an orthogonal turbine having: a second balanced blade having a first end, a second end, and a shape of a 3-dimensional spiral, wherein the first console arm engages the first end of the second balanced blade, the radius of the 3-dimensional spiral shape of the balanced blade has a first length, and the radius of the 3-dimensional spiral shape of the second balanced blade has a second length. Another aspect of the disclosure is an orthogonal turbine wherein the linear speed of the balanced blade is different than the linear speed of the second balanced blade. Another aspect of the disclosure is an orthogonal turbine having a second console arm engaged to the second end of the second balanced blade and a second shaft engaged to the second console arm. Another aspect of the disclosure is an orthogonal turbine wherein the balanced blade has a first balanced blade portion, a second balanced blade portion, and a flange, wherein the flange engages the first balanced blade portion and the second balanced blade portion.

Another aspect of the disclosure is an power generation system having an orthogonal turbine having a balanced blade having a first end and second end, a first console arm engaged to the first end of the balanced blade, whereby the balanced blade has the shape of a 3-dimensional spiral, a generator coupled to the orthogonal turbine, and a generator shaft engaged to the first shaft.

With those and other objects, advantages and features on the invention that may become hereinafter apparent, the nature of the invention may be more clearly understood by reference to the following detailed description of the invention, the appended claims, and the drawings attached hereto.

BRIEF DESCRIPTION OF THE DRAWINGS

The accompanying drawings, which are incorporated herein and form part of the specification, illustrate various embodiments of the present invention and together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION

In the following detailed description, reference is made to the accompanying drawings which form a part hereof and in which is shown by way of illustration specific embodiments in which the invention may be practiced. These embodiments are described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

The present disclosure pertains to an orthogonal turbine 10 for producing energy. The orthogonal turbine 10 allows for energy to be extracted from a flow f of medium or medium flow f and converted into useful work. The orthogonal turbine 10 is driven by the kinetic energy of a medium, such as liquid or air, to generate electrical power. The orthogonal turbine 10 can be applied to any area that provides for medium flow f, for example, bodies of water, such as seas, lakes, reservoirs, rivers, or the like, areas with wind, or the like.

Figure 1:
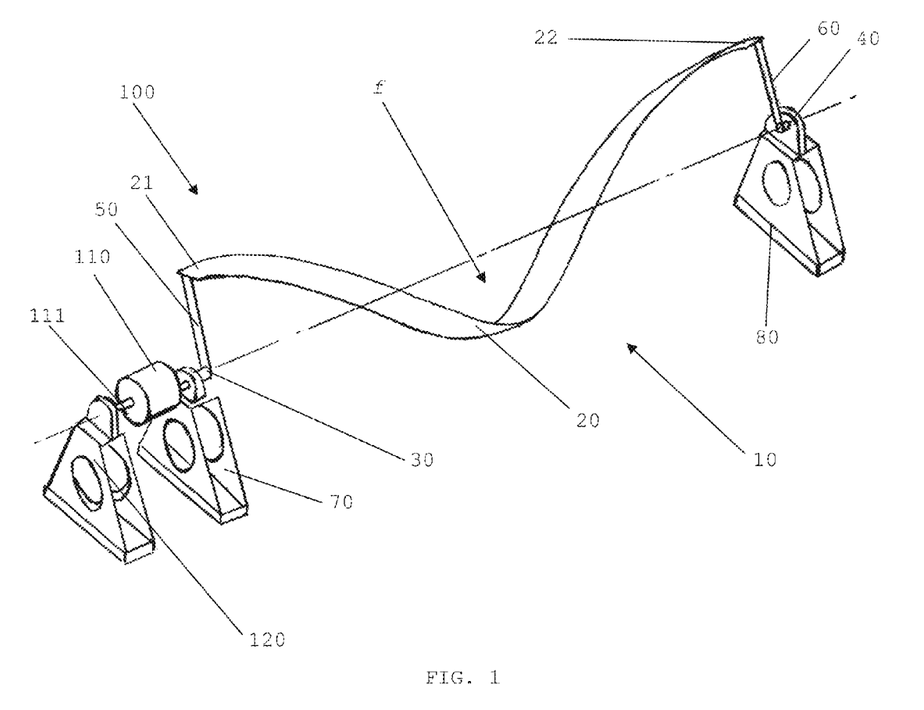
FIG. 1 is a perspective view of an electric power generation system according to an exemplary embodiment.
Figure 3:
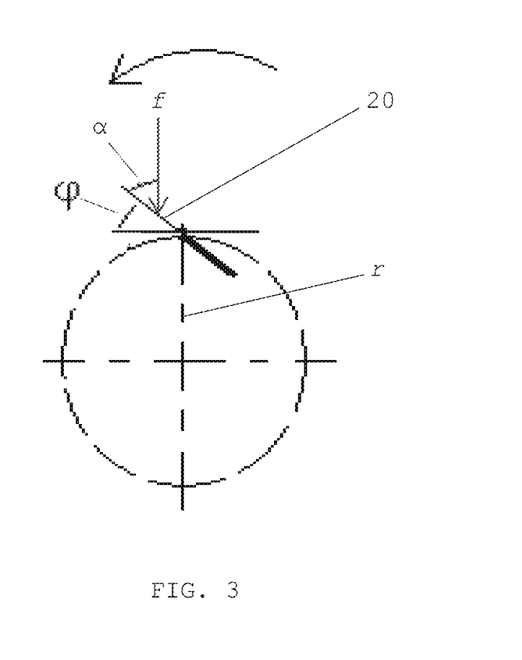
FIG. 3 is a cross-sectional view of a balanced blade according to an exemplary embodiment.

In one embodiment, as shown in FIG. 1, the orthogonal turbine 10 includes at least one balanced blade 20. The balanced blade 20 can have the shape of a 3-dimensional spiral, for example, without limitation, a helical spiral, spherical spiral, or conical spiral. In one embodiment, as shown in FIG. 3, the spiral has a constant radius r1 measured from the axial center to the balanced blade 20. The spiral shape of the balanced blade 20 enhances the ability of the orthogonal turbine 10 to produce energy. The maximum efficiency of the orthogonal turbine 10 is achieved when the ratio of the linear speed (V) of the balanced blade 20 to the local flow velocity (U) is within the range of V/U=2.5:1-4:1. Thus, the radius r1 of the balanced blade 20, which in turn impacts the linear speed of the balanced blade 20, can be adjusted to correspond to the local velocity distribution of medium flow f across the orthogonal turbine 10 in order to achieve maximum energy efficiency.

In one embodiment, each balanced blade 20 is balanced or the sum of the inertia or centrifugal forces acting on each balanced blade 20 is zero. In one embodiment, each balanced blade 20 is balanced where the sum of external forces or those resulting from the medium flow f acting on the balanced blade 20 during its rotation is constant. The net force during rotation resulting from the medium flow f acting on each balanced blade 20 is constant, that is the sum of the forces on the balanced blade 20 at a first position of the rotation is the same as the sum of the forces on the balanced blade 20 at a second position of the rotation. The net force during rotation is constant because the sum of the angles of the balanced blade 20 in relation to the medium flow f remain constant, that is the sum of the angles of the balanced blade 20 at a first position of the rotation is the same as the sum of the forces on the balanced blade 20 at a second position of the rotation. The balancing of each balanced blade 20 substantially reduces or eliminates the bending and/or pulsation of each balanced blade 20 due to forces stemming from the medium flow f. In one embodiment, the balance of each balanced blade 20 is achieved by the first end 21 of the balanced blade 20 having the same radial position or degrees of a cross-sectional circle of the 3-dimensional spiral as the second end 22 of the balanced blade 20. For example, without limitation, where FIG. 1 depicts the first end 21 of the balanced blade 20 at a position of 0 degrees, the second end 22 of the balanced blade 20 is at a position of 360 degrees.

The spiral configuration of the balanced blade 20 allows for a portion of the balanced blade 20 to be positioned optimally with respect to medium flow f regardless of the position of the balanced blade 20. This allows for the balanced blade 20 to provide a continuous speed of rotation uninterrupted by accelerations and decelerations. Since a portion of the balanced blade 20 is always optimally positioned with respect to medium flow f, the medium flow f will constantly apply a rotational force to the balanced blade 20 thus eliminating void zones during rotation of the balanced blade 20, or zones of the rotation of the balanced blade 20 where a force is not applied to the balanced blade 20 by the medium flow f.

In one embodiment, as shown in FIG. 3, at any position along the balanced blade 20, the balanced blade 20 has an angle $\phi$ relative to the tangent of a cross-sectional circle of the 3-dimensional spiral. For example, where the shape of the balanced blade 20 is a helical spiral, at any position along the balanced blade 20, the balanced blade 20 has an angle $\phi$ relative to the tangent of a cross-sectional circle of the helical spiral. In one embodiment, as shown in FIG. 3, at all positions along the balanced blade 20, the balanced blade 20 has an angle $\phi$ relative to the tangent of a cross-sectional circle of the 3-dimensional spiral. In one embodiment, the angle $\phi$ at every position along the balanced blade 20 is constant. The angle $\phi$ can be an acute angle, for example, without limitation, 3-21, 3-5, 5-10, 10-15, 15-21 degrees, or the like. The angle $\phi$ can be adjusted to account for different profiles of the balanced blade 20, different number of balance blades 20, and the solidity of the turbine.

While the angle $\phi$ can remain constant at every point along the balanced blade 20, the angle $\alpha$, or the angle of the cross-section of the chord relative to the medium flow f as shown in FIG. 3, at every point along the balanced blade 20 changes as a result of the 3-dimensional spiral shape. The angle $\alpha$ can vary from 0 to 360 degrees. Due to the angle $\alpha$ varying at points along the balanced blade 20, the torque moment and the forces acting on the balanced blade 20 at each cross-section of the balanced blade 20 that is parallel to the plane of medium flow f vary. In one embodiment, the length of the chord of the balanced blade 20 is constant at all points along the balanced blade 20. This combined with the fact that the 3-dimensional spiral uniformly curves so that the cross-section of the chord of the first end 21 of the balance blade 20 is at 0 degrees and cross-section of the chord of the second end 22 of the balance blade 20 is positioned at 360 degrees results in reciprocal or compensating forces at any cross-sectional plane of the balanced blade 20 parallel to the medium flow f. These compensating forces result in a total net or summarized constant force from the medium flow f and a constant velocity of the balanced blade 20. Therefore, the total net force and total net torque acting on the balanced blade 20 during rotation in the medium flow f with uniform velocity distribution do not change. In one embodiment, the total net force is applied to the middle of the blade by the medium flow f.

In one embodiment, the balanced blade 20 is a continuous piece of material. The material is a rigid or semi-rigid material in order to maintain the spiral shape of the balanced blade 20, for example, without limitation, metals, plastics, foams, polymers, or the like.

Figure 4:
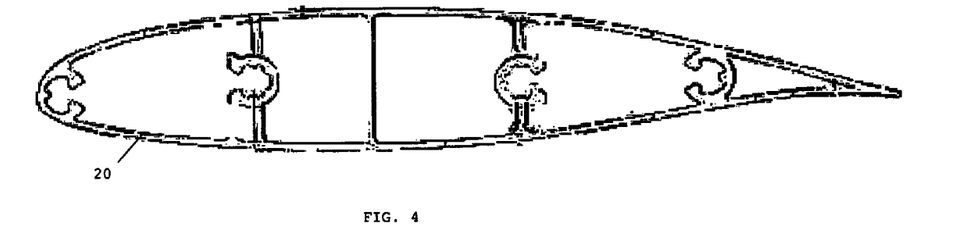
FIG. 4 is a cross-sectional view of a balanced blade according to an exemplary embodiment.

As shown in FIG. 4, the balanced blade 20 preferably has a cross-sectional shape of an airfoil to allow for the production of an aerodynamic force used to rotate the balanced blade 20. The aerodynamic force causes the balanced blade 20 to rotate towards the leading edge 23 of the balanced blade 20.

Figure 5:
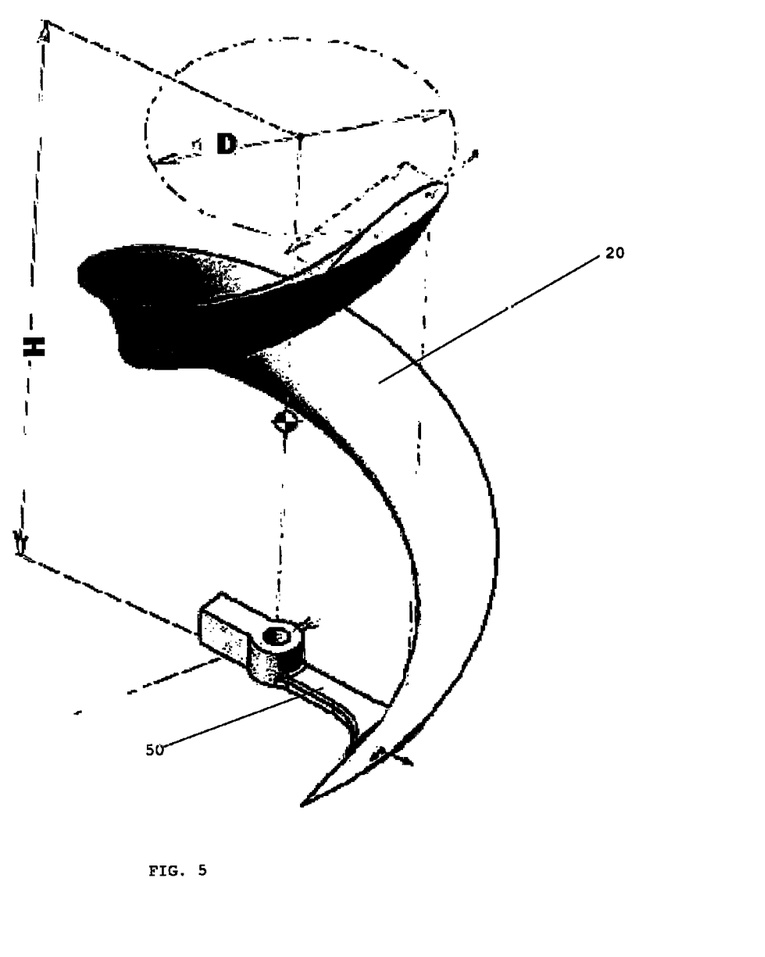
FIG. 5 is a perspective view of a balanced blade according to an exemplary embodiment.

The balanced blade 20 may have any diameter to length ratio and any 3-dimensional spiral radius r1 that is desired. In one embodiment, as shown in FIG. 5, the diameter D of the balanced blade 20 is less than the length (height) H of the balanced blade 20, for example, without limitation, the ratio of the length H to the diameter D can be within the range of H/D=3:1-4:1.

The balanced blade 20 may be made from any suitable material, such as metals, plastics, foams, polymers, or a combination thereof. In one embodiment, the balanced blade 20 has a foam core forming the interior of the balanced blade 20, which is then covered with a carbon fiber, fiberglass composite, metal, or polymeric shell. In one embodiment, the balanced blade 20 forms a hollow interior and is constructed as a carbon fiber, fiberglass composite, metal, polymeric shell, or the like.

In one embodiment, the balanced blade portions (not shown) or sections of the balanced blade 20 can be combined in order to create a larger or longer balanced blade 20. The balanced blade 20 can have a streamlined construction. The balanced blade portions can be combined with flanges or plates where a flange engages a first balanced blade portion and a second balanced blade portion.

Figure 6:
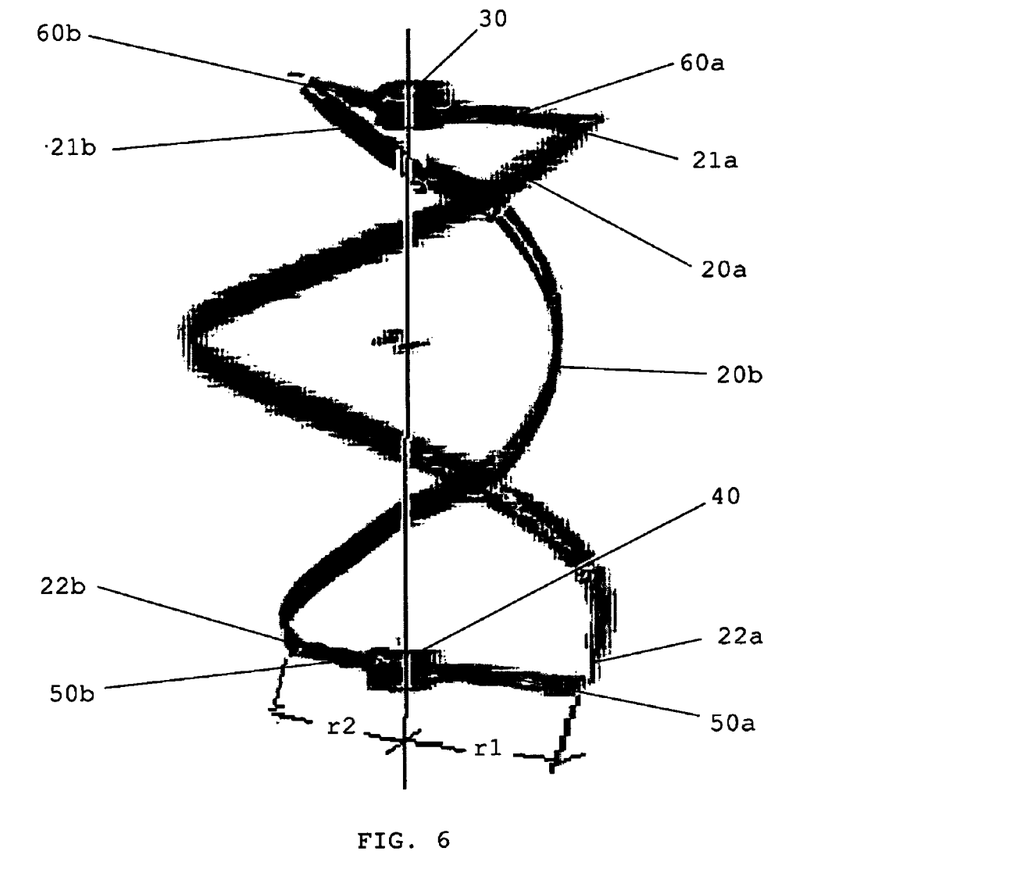
FIG. 6 is a perspective view of a balanced blade according to an exemplary embodiment.

By way of example to describe an orthogonal turbine 10 with multiple balanced blades 20, as shown in FIG. 6, the orthogonal turbine 10 can have a first balanced blade 20a and a second balanced blade 20b. In this embodiment, a first balanced blade 20a has a radius r1 and the second balance blade 20b has a radius r2. The radius r1 of the first balanced blade 20a has a first length and the radius r2 of the second balanced blade 20a has a second length. The length of the radius r1 of the first balance blade 20a can be greater than the length of the radius r2 of the second balanced blade 20a thereby allowing for the second balance blade 20b to rotate inside the volume defined by the 3-dimensional spherical shape of the first balanced blade 20a. The first balanced blade 20a and a second balanced blade 20b can have different linear speed. The radius r1 and r2 can be adjusted to correspond to the local velocity distribution of medium flow f through the inside of the orthogonal turbine 10 in order to achieve maximum energy efficiency. The length of the radius r1 of the first balance blade 20a can be the same as the length of the radius r2 of the second balanced blade 20a, which can generate a constant net force acting on the balanced blade 20.

Figure 2:
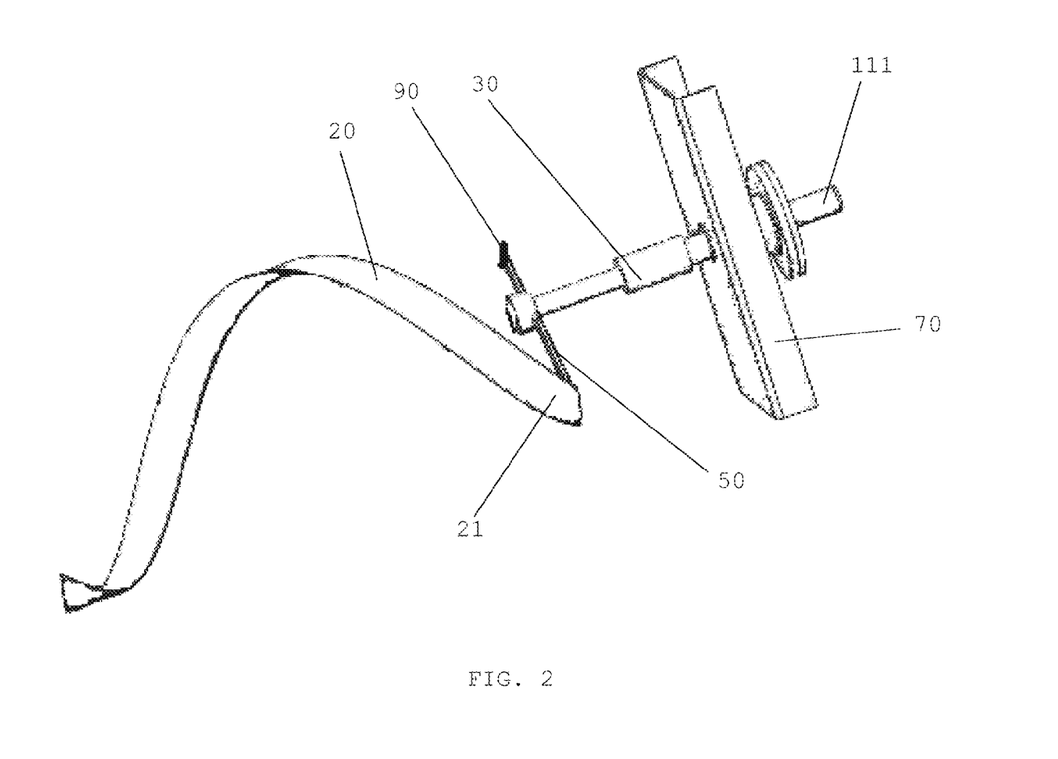
FIG. 2 is a perspective view of a portion of an orthogonal turbine according to an exemplary embodiment.

In one embodiment, the orthogonal turbine 10 can have a first shaft 30 for transferring rotational energy to the generator. In one embodiment, one end of the first shaft 30 is coupled to the balanced blade 20 and the other end of the first shaft 30 is rotationally engaged to the first support member 70. In one embodiment, as shown in FIGS. 1 & 2, the balanced blade 20 is connected to the first shaft 30 by way of a first console arm 50. Since the balanced blade 20 is fixedly mounted to the first shaft 30, rotation of the balanced blade 20 results in rotation of the first shaft 30. The first console arm 50 can engage the balanced blade 20 at one end of the first console arm 50 and the first shaft 30 at the other end of the first console arms 50. For example, without limitation, the first console arm 50 engages the first end 21 of the balanced blade 20 at one end of the first console arm 50 and engages the first shaft 30 at the other end of the first console arm 50. In this embodiment, the rigidness of the balanced blade 20 allows for the absence of a second console arm 60 engaged to a second shaft 40 while maintaining the 3-dimensional spiral shape.

In one embodiment, the orthogonal turbine 10 can have a first and second shaft 30, 40 for transferring rotational energy to the generator. In one embodiment, as shown in FIGS. 1 & 2, the balanced blade 20 is connected to the first and second shaft 30, 40 by way of a first and second console arm 50, 60. Since the balanced blade 20 is fixedly mounted to the first and second shaft 30, 40, rotation of the balanced blade 20 results in rotation of the first and second shaft 30, 40. The first and second console arms 50, 60 can engage the balanced blade 20 at one end of the first and second console arms 50, 60 and either of the first and second shafts 30, 40 at the other end of the first and second console arms 50, 60. For example, without limitation, as shown in FIGS. 1 & 2, the first console arm 50 engages the first end 21 of the balanced blade 20 at one end of the first console arm 50 and engages the first shaft 30 at the other end of the first console arm 50. The second console arm 60 engages the second end 22 of the balanced blade 20 at one end of the second console arm 60 and engages the second shaft 40 at the other end of the second console arm 60. The first and second console arms 50, 60 and the first and second shafts 30, 40 may be made from any suitable material, such as metals, plastics, polymers, the like, or any combinations thereof.

In one embodiment, where the orthogonal turbine 10 has a first balanced blade 20a and second balanced blade 20b, as shown in FIG. 6, the first balanced blade 20a is coupled to the first and second shaft 30, 40 by way of a first and second console arm 50a, 60a and the second balanced blade 20b is connected to the first and second shaft 30, 40 by way of a first and second console arm 50b, 60b. Since the first balanced blade 20a and second balanced blade 20b is fixedly mounted to the first and second shaft 30, 40, rotation of the first balanced blade 20a and second balanced blade 20b results in rotation of the first and second shaft 30, 40. The first and second console arms 50a, 60a can engage the balanced blade 20a at one end of the first and second console arms 50a, 60a and either of the first and second shafts 30, 40 at the other end of the first and second console arms 50a, 60a. For example, without limitation, as shown in FIG. 6, the first console arm 50a engages the first end 21a of the first balanced blade 20a at one end of the first console arm 50a and engages the first shaft 30 at the other end of the first console arm 50a. The second console arm 60a engages the second end 22a of the first balanced blade 20a at one end of the second console arm 60a and engages the second shaft 40 at the other end of the second console arm 60a. The second console arm 50b engages the first end 21b of the second balanced blade 20b at one end of the first console arm 50b and engages the first shaft 30 at the other end of the first console arm 50b. The second console arm 60b engages the second end 22b of the balanced blade 20b at one end of the second console arm 60b and engages the second shaft 40 at the other end of the second console arm 60b.

Figure 7A:
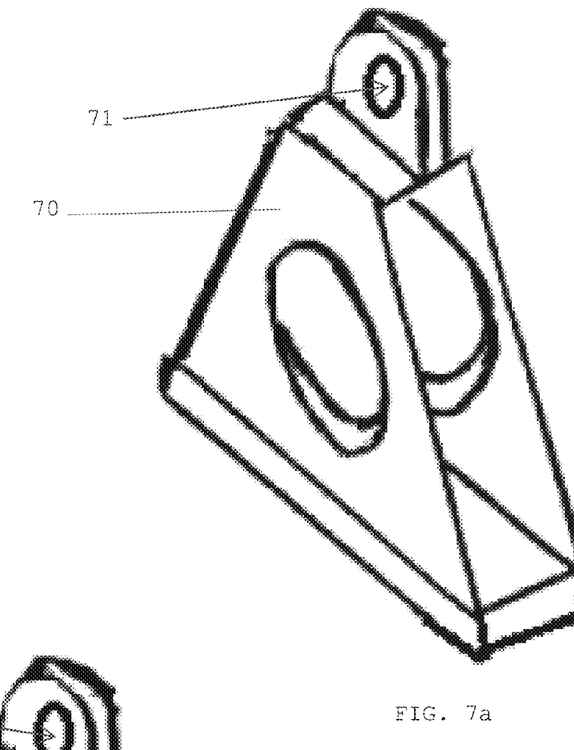
FIG. 7a is a perspective view of a first support member according to an exemplary embodiment.
Figure 7B:
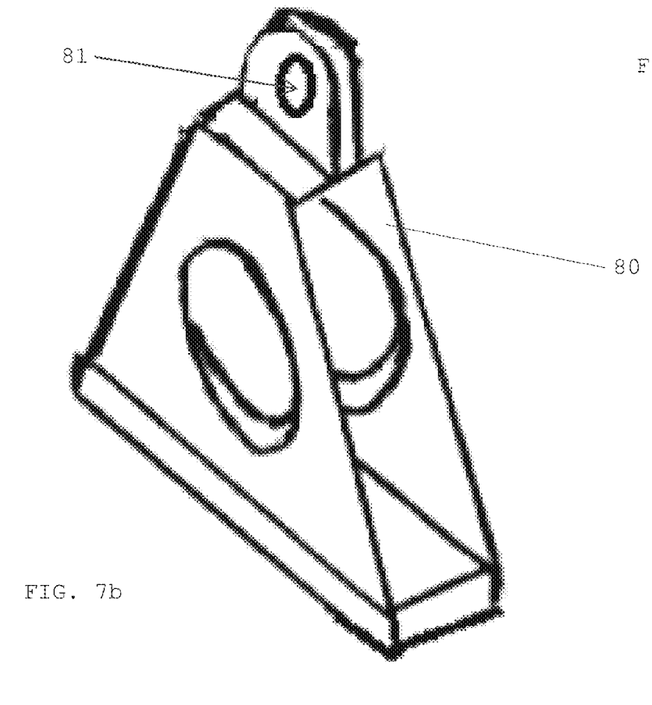
FIG. 7b is a perspective view of a second support member according to an exemplary embodiment.

In one embodiment, the orthogonal turbine 10 can have a first and second support member 70, 80 for mounting the orthogonal turbine 10. As shown in FIGS. 7a and 7b, the first and second support members 70, 80 can have a first and second shaft hole 71, 81 for receiving either the first or second shaft 30, 40. For example, the first support member 70 can have a first shaft hole 71 for receiving the first shaft 30 and the second support member 80 can have a second shaft hole 81 for receiving the second shaft 40.

In one embodiment, the orthogonal turbine 10 can have at least one counterbalance 90 for providing balance to the first and/or second console arms 50, 60 thereby allowing for the balanced blade 20 to rotate more smoothly and the orthogonal turbine 10 to operate more energy efficiently. The counterbalance 90 can engage the first or second console arm 50, 60 at a point opposite the position the first or second console arm 50, 60 engages the balanced blade 20. For example, where the balanced blade 20 engages the first console arm 50 at 0 degrees, the counterbalance 90 can engage the first console arm 50 at 180 degrees. In one embodiment, a counterbalance 90 engages the first console arm 50 and another counterbalance 90 engages the second console arm 60. The counterbalance 90 has a weight corresponding to the weight of the first or second console arm 50, 60 opposite the counterbalance 90. The counterbalance 90 can be made of metals, plastics, polymers, stone, or the like.

Figure 8:
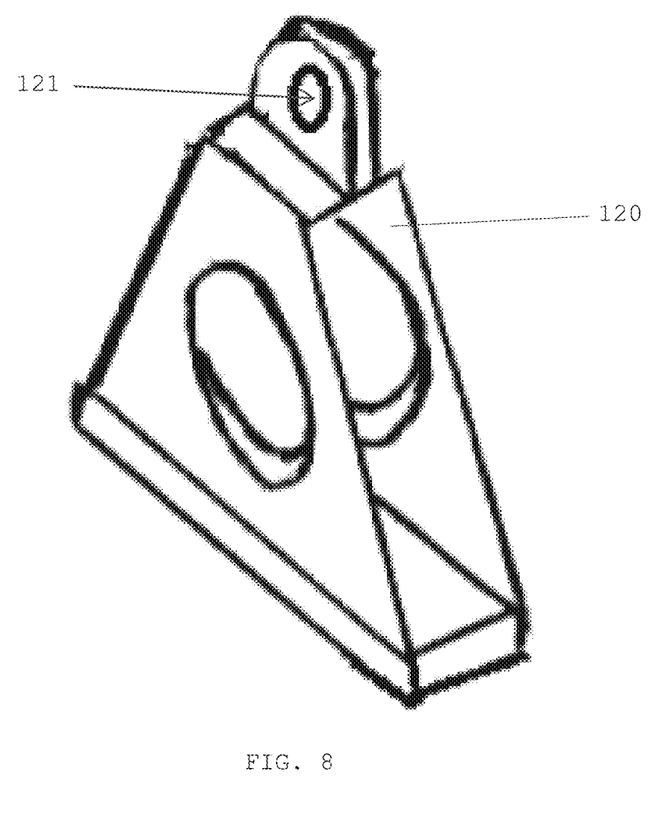
FIG. 8 is a perspective view of a generator support member according to an exemplary embodiment.

In one embodiment, the orthogonal turbine 10 can be a component of an electric power generation system 100. The electric power generation system 100 can have a generator 110 for converting mechanical energy to electrical energy. While the generator 110 can be any mechanism for converting mechanical energy to electrical energy, the generator 110 is preferably a coaxial generator that allows for rotation speed variations that increases the energy output upon a change in medium flow f. The generator 110 is coupled to the orthogonal turbine 10. The generator 110 can be engaged to a generator shaft 111 which in turn can be engaged to the first or second shaft 30, 40. Since the generator shaft can be engaged to the first or second shaft 30, 40, rotation of the first or second shaft 30, 40 results in rotation of the generator shaft 111. A generator support member 120 suspends the generator above a surface and/or stabilizes the generator. As shown in FIG. 8, the generator support member 120 can have a generator shaft hole 121 for receiving the generator shaft 110. A wire or cable capable of allowing electricity to travel between two locations can engage the generator 110 at one end of the wire.

The orthogonal turbine 10 can be positioned across the medium flow f, for example, water, air, or the like. The orthogonal turbine 10 may be oriented in any direction with respect to the ground, such as horizontally, vertically, or angled. In some embodiments, the orthogonal turbine 10 is oriented such that the balanced blade 20 is mounted transversely to the direction of medium flow f for rotation in a plane parallel to the direction of medium flow f.

In use, the orthogonal turbine 10 is positioned orthogonally across a liquid flow f as shown in FIG. 1. The liquid flow f begins to rotate the balanced blade 20. The rotation of the balanced blade 20 rotates the first and second shaft 30, 40. In this example, the rotation of the first shaft 30 rotates the generator shaft 111 engaged to the generator 110, and the generator 110 produces electric energy. The electric energy is transferred by way of a wire (not shown) from the generator 110 to another location.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

Modifications and variations of the present invention are possible in light of the above teachings. It is therefore to be understood that the invention may be practiced otherwise than as specifically described herein.

What is claimed is:

1. An orthogonal turbine comprising:
   a balanced blade having a first end and second end,
   a first console arm engaged to the first end of the balanced blade,
   a first shaft engaged to the first console arm,
   wherein the balanced blade has the shape of a 3-dimensional continuous spiral,
   wherein the balanced blade extends around a space from the axis of rotation of the balanced blade, and wherein the length of the shaft extends from a position exterior to the balanced blade to a position corresponding to the end of the balance blade.

2. The orthogonal turbine of claim 1 wherein the first end of the balanced blade has the same radial degree as the second end of the balanced blade.

3. The orthogonal turbine of claim 1 wherein the sum of the centrifugal forces acting on the balanced blade is substantially zero.

4. The orthogonal turbine of claim 1 wherein a net force is applied to the middle of the balanced blade.

5. The orthogonal turbine of claim 1 wherein the balanced blade has an angle $\phi$ relative to the tangent of a cross-sectional circle of the 3-dimensional spiral at every point along the balanced blade.

6. The orthogonal turbine of claim 1 wherein the diameter of the balanced blade is less than the length of the balanced blade.

7. The orthogonal turbine of claim 1 further comprising a second console arm engaged to the second end of the balanced blade and a second shaft engaged to the second console arm.

8. The orthogonal turbine of claim 1 further comprising a first counterbalance engaged to the first console arm.

9. The orthogonal turbine of claim 1 further comprising a first support member having a first shaft hole capable of receiving the first shaft and a second support member having a second shaft hole capable of receiving a second shaft.

10. The orthogonal turbine of claim 1 further comprising:
    a second balanced blade having a first end, a second end, and a shape of a 3-dimensional spiral,
    wherein the first console arm engages the first end of the second balanced blade, the radius of the 3-dimensional spiral shape of the balanced blade has a first length, and the radius of the 3-dimensional spiral shape of the second balanced blade has a second length.

11. The orthogonal turbine of claim 10 wherein the linear speed of the balanced blade is different than the linear speed of the second balanced blade.

12. The orthogonal turbine of claim 11 further comprising a second console arm engaged to the second end of the second balanced blade and a second shaft engaged to the second console arm.

13. The orthogonal turbine of claim 1 wherein the balanced blade comprises:
    a first balanced blade portion,
    a second balanced blade portion, and
    a flange,
    wherein the flange engages the first balanced blade portion and the second balanced blade portion.

14. A power generation system comprising:
    the orthogonal turbine of claim 1,
    a generator coupled to the orthogonal turbine, and
    a generator shaft engaged to the first shaft.

* * * * *